United States Patent
Chang et al.

(10) Patent No.: US 7,014,121 B2
(45) Date of Patent: Mar. 21, 2006

(54) METHOD OF SELF-DETECTING AND DYNAMICALLY DISPLAYING DETECTED RESULTS FOR A CARD READER USED TO READ FLASH MEMORY CARDS

(75) Inventors: Chi-Tung Chang, Taipei (TW); HUng-Chou Tsai, Nantou (TW); Chao-Yu Chen, Taipei (TW)

(73) Assignee: Alcor Micro, Corp., Taipei (TW)

( * ) Notice: Subject to any disclaimer, the term of this patent is extended or adjusted under 35 U.S.C. 154(b) by 8 days.

(21) Appl. No.: 10/888,706

(22) Filed: Jul. 12, 2004

(65) Prior Publication Data

US 2006/0006233 A1    Jan. 12, 2006

(51) Int. Cl.
*G06K 19/06* (2006.01)
*G06K 7/08* (2006.01)
(52) U.S. Cl. .................... 235/492; 235/451
(58) Field of Classification Search ........... 235/451, 235/492; 340/932.2, 540
See application file for complete search history.

(56) References Cited

U.S. PATENT DOCUMENTS

| | | | | |
|---|---|---|---|---|
| 6,111,522 A | * | 8/2000 | Hiltz et al. | 340/932.2 |
| 6,793,142 B1 | * | 9/2004 | Yap | 235/492 |
| 6,816,071 B1 | * | 11/2004 | Conti | 340/540 |
| 2004/0035930 A1 | * | 2/2004 | Arisawa et al. | 235/451 |

* cited by examiner

*Primary Examiner*—Thien M. Le
*Assistant Examiner*—Thien Mai

(57) ABSTRACT

A method of self-detecting and dynamically displaying detected results for a card reader used to read flash memory cards includes the steps of sending out a detecting code to each card slot or any flash memory card inserted therein via detecting circuits provided on and controlled by a control chip in the card reader; storing a detected state code sent back by the detecting circuits in a state register of the control chip; sending the state code from the state register to a computer; comparing and determining the state code in the computer; displaying a current state of the card slot or the flash memory card inserted therein on a screen of the computer; and periodically repeating the self-detecting and displaying to always show the most current state of the card slots on the card reader or the inserted flash memory card.

9 Claims, 1 Drawing Sheet

METHOD OF SELF-DETECTING AND DYNAMICALLY DISPLAYING DETECTED RESULTS FOR A CARD READER USED TO READ FLASH MEMORY CARDS

FIELD OF THE INVENTION

The present invention relates to a method of self-detecting and dynamically displaying detected results for a card reader used to read flash memory cards, and more particularly to a method of self-detecting and dynamically displaying detected results for a card reader that enables timely display on a screen of a computer the most current state of each card slot on the card reader or of the flash memory card inserted in the card slot.

BACKGROUND OF THE INVENTION

Flash memory cards are high-capacity storing media developed to meet consumers' demands in storing the huge amount of information and data, and have been widely adopted by consumers to replace the conventional floppy disk. The flash memory cards have also led to the prosperous development in the card reader industry.

Several years ago, the flash memory cards were popular only in the field of digital cameras, and most of them were directly connected to a computer via a USB data transmission line. The most important function of the flash memory card at that time was to store photos taken with a digital camera. However, the flash memory card must be connected to the computer via a transmission line and a driver must be installed in the computer for the flash memory card to work. Inconveniences surface when the flash memory card is to be used on more than one computer. Nevertheless, flash memory cards have since been developed to store multimedia information, prompting the development of card readers that are now an important apparatus bridging the flash memory cards and computers.

The main function of the card reader is to serve as a bridge between the flash memory card and the computer to complete data transmission between them. Via the card reader, a user may browse photos stored on the flash memory card, listen to music, and store files on a computer without being connected to the computer. The flash memory card is therefore effortlessly upgraded to a mini massive storage device that can be easily carried along with the user. Currently, there are various types of card readers for use with flash memory cards of different specifications, such as, for example, CompactFlash Type I&II (CF), Microdrive (MD), SmartMedia (SM), Memory Stick (MS), MS Pro, MS Duo, MultiMedia Card (MMC), Secure Digital (SD), and the newly developed xD Picture card (xD). With the introduction of the above-mentioned various types of flash memory cards into the market, the card readers also have been developed from one reader one slot to the one reader multiple slots in order to adapt to different flash memory cards.

It is difficult for consumers to have complete ideas about all these flash memory cards currently available in the market. When a card reader is connected to the Microsoft Windows operating system via a universal serial bus (USB), the system would identify how many flash memory cards in the card slots of the card reader are supported by the card reader, and would show the same number of removable hard disks on the screen of the computer. Moreover, regardless of whether there is a flash memory card inserted in a card slot, all the currently available card readers are adapted to report the total number of card slots, and Windows will always show the same number of removable hard disks as that of the reported card slots. Under the circumstance, it is uneasy for a user to tell which one of the icons of the removable hard disks represents which specific flash memory card slot. The user could hardly tell from the icons on the screen what type of flash memory card has been inserted in a card slot, particularly when the card reader includes multiple card slots. A conventional method of detecting a current state of a card reader is to show each detected supporting flash memory card as a removable hard disk. The user may be confused by these additional removable hard disks, and fails to tell from the screen which one of the card slots has a flash memory card inserted therein, and what is the exact type of the inserted flash memory card.

Another problem with most currently available electronic products is that there is not any sign before any failure or disorder of such electronic products. From past experiences, the most common reasons for the failure or disorder of an electronic product include aging of internal electronic components or parts, and incorrect operation of the product. When similar conditions occur on a card reader or a flash memory card inserted therein, it is very possible to lose all the data stored in the memory card, or to seriously damage the computer and other peripherals connected thereto. And, it is impossible for the user to know the damaged state in advance. Therefore, it is desirable to previously detect the most current state of the card reader or the flash memory card inserted therein to avoid the above-mentioned undesired events.

SUMMARY OF THE INVENTION

A primary object of the present invention is to provide a method of self-detecting and dynamically displaying detected results for a card reader used to read flash memory cards, so that the most current state of the card slots on the card reader or any flash memory card inserted therein can be timely displayed on a screen of a computer that is connected to the card reader and has supporting software installed therein.

To achieve the above and other objects, the method of the present invention mainly includes the steps of sending out a detecting code to each card slot or a flash memory card inserted therein via detecting circuits provided on and controlled by a control chip in the card reader; storing a detected state code sent back by the detecting circuits in a state register of the control chip; sending the state code from the register to a computer; comparing and determining the state code by part of the software in the computer on receipt of the state code; displaying a current state of the card slot or the flash memory card inserted therein on a screen of the computer; and periodically repeating the detecting and displaying. Thereby, the most current state of card slots on the card reader or any flash memory card inserted in the card slot can always be presented before a user.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
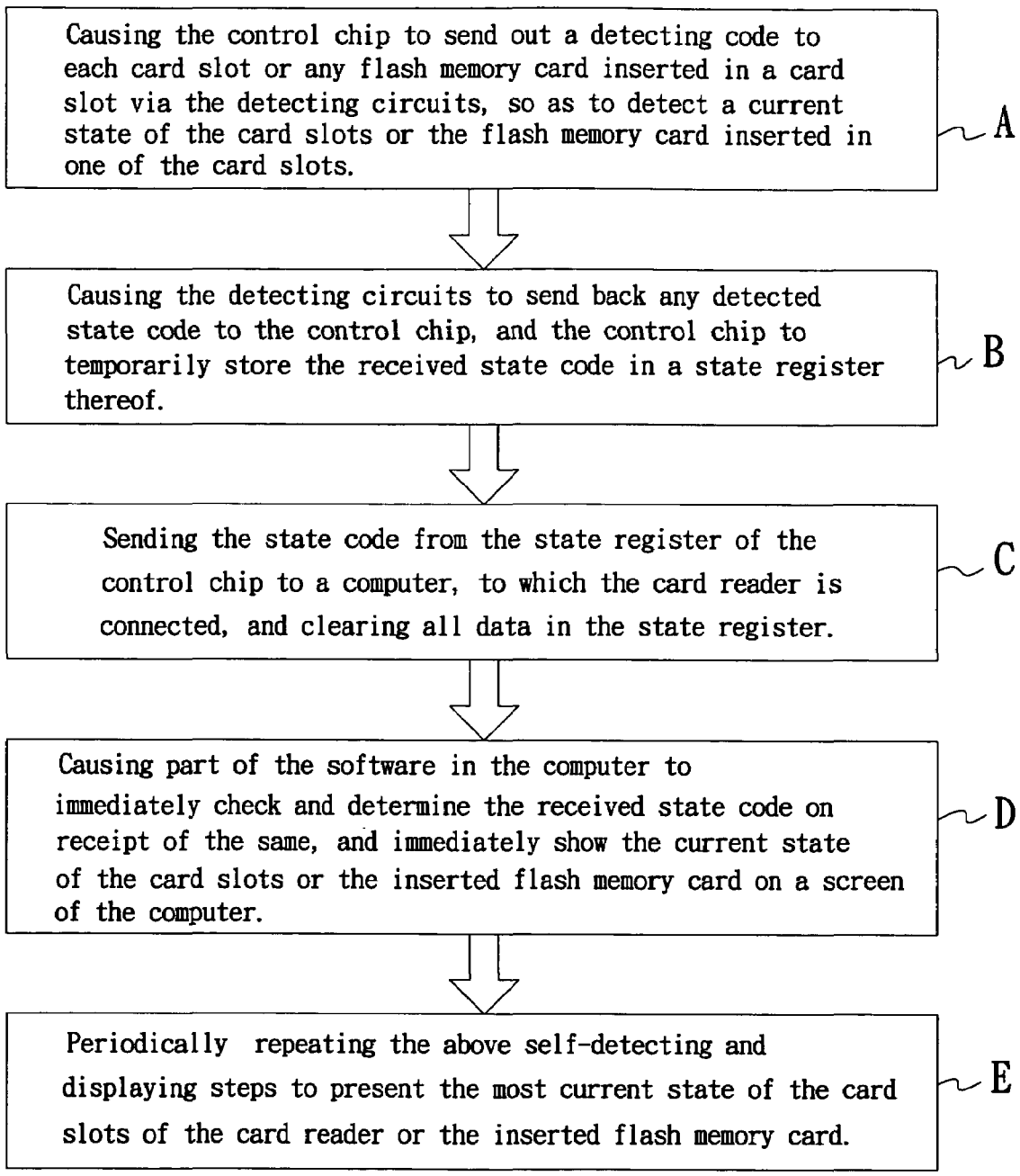
FIG. 1 is a flowchart of the method of self-detecting and dynamically displaying detected results for a card reader used to read flash memory cards.

Please refer to FIG. 1 that is a flowchart showing the steps included in the method of the present invention.

In a card reader for use with the method of the present invention, there is provided a control chip for controlling more than one detecting circuit preset on the control chip. Although not shown in the figure, the card reader may either be a type of one reader for one card or a type of one reader for multiple cards. Moreover, since the detecting circuits are known techniques and are indirectly utilized to implement the method of the present invention instead of being a key point thereof, they are not discussed in details herein.

As can be seen from FIG. 1, in the method of the present invention, the steps for self-detecting of the card reader and displaying of detected results include:

A. Causing the control chip to send out a detecting code to each card slot or any flash memory card inserted in a card slot via the detecting circuits, so as to detect a the current state of the card slots or the flash memory card inserted in one of the card slots;

B. Causing the detecting circuits to send back any detected state code to the control chip, and the control chip to temporarily store the received state code in a state register thereof;

C. Sending the state code from the state register of the control chip to a computer, to which the card reader is connected, and clearing all data in the state register;

D. Causing part of the software in the computer to immediately check and determine the received state code on receipt of the same, and immediately show the current state of the card slots or the inserted flash memory card on a the screen of the computer; and E. Periodically repeating the above self-detecting and displaying steps to present the most current state of the card slots of the card reader or the inserted flash memory card.

The detecting circuits include an overcurrent protection. When any one of the card slots and the inserted flash memory card are detected as short-circuited, the control chip will take measures to interrupt the power supply to the specific short-circuited card slot, and temporarily store the state code in the state register for the computer to retrieve the data later. And, when the part of the software in the computer receives the state code, an icon or a color normally displayed for representing the card slot or the flash memory card is immediately changed to inform a user that the specific card slot or the flash memory card inserted therein is currently in a short-circuited and interrupted state and is failing to work properly.

On the other hand, when the card reader is in a normal state, the self-detecting and dynamic displaying method of the present invention will cause the display of icons and different colors representing the card slots of the card reader on the screen, in the case of one reader for multiple slots. When one of the card slots has a flash memory card inserted therein, the detecting circuits will immediately detect the slot with the flash memory card as well as the format and type of the inserted flash memory card, and send back the detected state code to the control chip for retrieval and comparison by the computer later. After the state code is compared to the data stored in an internal databank of the computer by the part of software in the computer, a predetermined corresponding icon or color will replace the icon or color originally displayed on the screen for representing the empty card slot, so that the user can clearly know in which slot a flash memory card is currently inserted and the type of the inserted flash memory card. The current state of the inserted flash memory card is also displayed using a specific icon or color. For example, a write-protection state, a damaged state, or the remained storage capacity of the flash memory card all can be displayed on the screen using different icons and colors, so that the user may immediately determine the working state of the flash memory card.

In the event that the detecting circuits detect that the inserted flash memory card is in the reading/writing state, the computer would also immediately show on the screen a specific dynamic icon to indicate the reading/writing state of the flash memory card, so that the user can clearly know the current reading/writing state to avoid pulling the flash memory card out of the card reader while the flash memory card is in the reading/writing state, and thereby reduces the probability of damaging the flash memory card and the card reader. In this way, the most current state of a specific card slot or a flash memory card inserted therein can always be timely presented before the user.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A method of self-detecting and dynamically displaying detected results for a card reader containing at least one card slot used to read flash memory cards, said card reader being internally provided with a control chip for controlling more than one detecting circuit preformed thereon, said self-detecting and displaying method comprising the steps of:

A. Causing the control chip to send out a detecting code to each card slot or any flash memory card inserted in said card slot via the detecting circuits, so as to detect a current state of said card slots or said flash memory card inserted in one of said card slots;

B. Causing the detecting circuits to send back any detected state code to the control chip, and the control chip to temporarily store the received state code in a state register thereof;

C. Sending the state code from the state register of the control chip to a computer, to which the card reader is connected, and clearing all data in the state register;

D. Causing a part of the software in the computer to immediately check and determine the state code on receipt of the same, and immediately display a current state of said card slots or said flash memory card on a screen of the computer; and E. Periodically repeating the above self-detecting and displaying steps to present the most current state of said card slots of the card reader or said flash memory card inserted in said card slot.

2. The method of self-detecting and dynamically displaying detected results for a card reader used to read flash memory cards as claimed in claim 1, wherein said detecting circuits include an overcurrent protection, which enables said control chip to take steps comprising of:

interrupting a power supply to the card slot when said card slot or flash memory card inserted therein is detected as short-circuited; temporarily storing said state code in said state register for the computer to retrieve later; and receiving said state code by the part of software in the computer; and immediately changing an icon or a color normally displayed for representing the card slot or the flash memory card to inform a user that the card slot or the flash memory card inserted therein is currently in a short-circuited and interrupted state.

3. The method of self-detecting and dynamically displaying detected results for a card reader used to read flash memory cards as claimed in claim 1, wherein said card reader is a one reader for one card type or one reader for multiple cards type.

4. The method of self-detecting and dynamically displaying detected results for a card reader used to read flash memory cards as claimed in claim 1, wherein an icon and a specific color representing each card slot before any flash memory card is inserted is shown on the screen of the computer.

5. The method of self-detecting and dynamically displaying detected results for a card reader used to read flash memory cards as claimed in claim 1, wherein when any one of said card slots has a flash memory card inserted therein, said detecting circuits will immediately detect said card slot with the flash memory card, format and type of said inserted flash memory card, send back a detected state code to said control chip for retrieval and comparison by the computer later; after compare said detected state code with data stored in an internal databank of the computer using said part of software in the computer, and replace the icon or color originally shown for representing said card slot in an empty state with a predetermined corresponding icon or color that shows in which card slot a flash memory card is currently inserted and the type of the inserted flash memory card.

6. The method of self-detecting and dynamically displaying detected results for a card reader used to read flash memory cards as claimed in claim 1, wherein when any of said card slots has a flash memory card inserted therein and said inserted flash memory card is in a write-protection state, said detecting circuits will immediately detect said card slot with the flash memory card, format and type of said inserted flash memory card, send back a detected state code to said control chip for retrieval and comparison by the computer later; after compare said detected state code with data stored in an internal databank of the computer using said part of software in the computer, replace the icon or color originally shown for representing said card slot in an empty state with a predetermined corresponding icon or color that shows in which card slot said flash memory card is currently inserted and that said flash memory card is in the write-protection state.

7. The method of self-detecting and dynamically displaying detected results for a card reader used to read flash memory cards as claimed in claim 1, wherein when any of said card slots on said card reader has a flash memory card inserted therein and said inserted flash memory card is in a damaged state, said detecting circuits will immediately detect said card slot with the flash memory card format and type of said inserted flash memory card, send back a detected state code to said control chip for retrieval and comparison by the computer later; after compare said detected state code with data stored in an internal databank of the computer using said part of software in the computer, replace the icon or color originally shown for representing said card slot in an empty state with a predetermined corresponding icon or color that shows in which card slot said flash memory card is currently inserted and that said flash memory card is in a damaged state.

8. The method of self-detecting and dynamically displaying detected results for a card reader used to read flash memory cards as claimed in claim 1, wherein when any of said card slots has a flash memory card inserted therein, said detecting circuits will immediately detect said card slot with the flash memory card format and type of said inserted flash memory card, send back a detected state code to said control chip for retrieval and comparison by the computer later; after compare said detected state code with data stored in an internal databank of the computer using said part of software in the computer, and replace the icon or color originally shown for representing said card slot in an empty state with a predetermined corresponding icon or color that shows in which card slot said flash memory card is currently inserted and the remained storage capacity of said inserted flash memory card.

9. The method of self-detecting and dynamically displaying detected results for a card reader used to read flash memory cards as claimed in claim 1, wherein when said detecting circuits detect that said flash memory card is in the reading/writing state, a detected state code is sent back to said control chip for retrieval and comparison by the computer later; and said part of software in the computer, after comparing said detected state code with data stored in an internal databank of the computer, immediately show a predetermined corresponding icon or color to indicate the reading/writing state of said flash memory card to substitute for an icon or color originally shown on the screen for representing said card slot in an empty state.

* * * * *